Patented Mar. 31, 1931

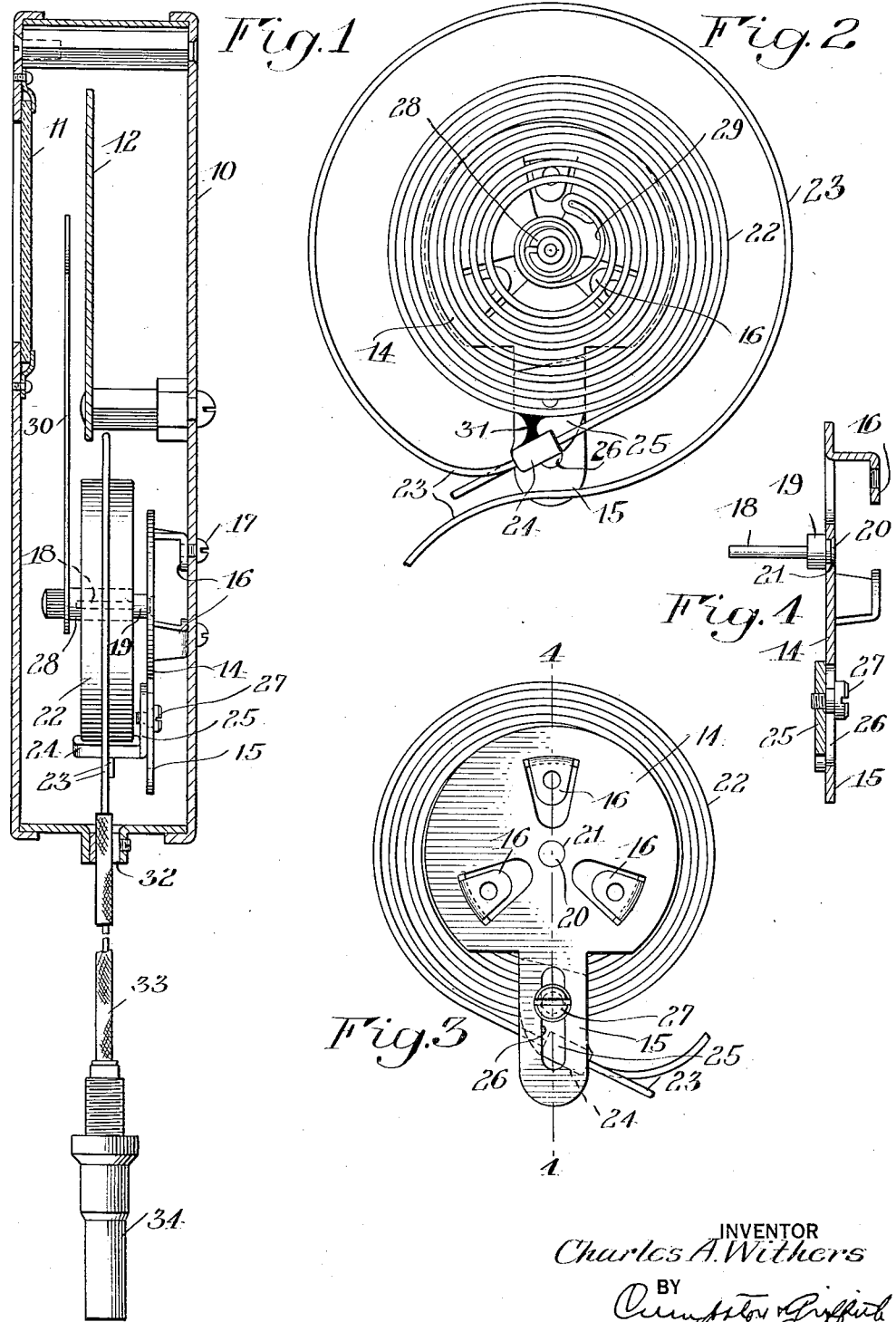

1,798,645

UNITED STATES PATENT OFFICE

CHARLES A. WITHERS, OF ROCHESTER, NEW YORK, ASSIGNOR TO TAYLOR INSTRUMENT COMPANIES, OF ROCHESTER, NEW YORK, A CORPORATION OF NEW YORK

BOURDON-SPRING UNIT

Application filed March 8, 1926. Serial No. 93,079.

This invention relates to pressure responsive devices and particularly to measuring, indicating, recording or controlling instruments of the type utilizing the Bourdon tube, which is employed for various purposes such as operating an indicating or recording instrument, or performing some other useful function.

One end of such a tube is commonly anchored and connected to a source of pressure, and the other end connected to a driven element such as an indicating or recording arm. The tubes may be of spiral form and when the anchored end is held against all movement, the coil in contracting and expanding is forced to distort itself undesirably to some extent, and therefore, it is not uniformly and accurately responsive to the pressures to which it is subjected. The coil as heretofore constructed may also be given a permanent distortion when subjected to unduly high pressures or unusual increases in volume.

A spiral tube will expand and contract to some extent under local changes of temperature, which vary the reading or action of the instrument independently of the pressure to which it should be responsive, and for that reason improper and inaccurate action or readings frequently are taking place.

An object of the invention is to provide an improved pressure responsive instrument of the spiral Bourdon tube type with which the tube may expand and contract for a full movement with a maximum freedom, so as to be more accurately responsive and sensitive to variations in pressure to which its interior is subjected and with which the tube is relieved as far as possible of stresses and strains induced therein during this expansion and contraction.

A further object is to provide an improved instrument of this type with which permanent set or distortion, due to unduly high pressures or unusual increases in volume in the actuating fluid, will be prevented without restricting the full and free movement of the tube.

Another object is to provide an improved instrument of this type with which changes in temperature in the locality of the instrument, and to which response of the instrument is not desired, will be automatically compensated for.

Another object is to provide an improved instrument of this type, for accomplishing each and all of the above objects, and for overcoming each and all of the difficulties herein above mentioned, which will be simple, durable and relatively inexpensive.

Various other objects and advantages will be apparent from the following description of an embodiment of the invention and the novel features will be particularly pointed out hereinafter in connection with the appended claims.

In the accompanying drawing:

Figure 1 is a sectional elevation of an indicating instrument of this type, which is constructed in accordance with the invention.

Figure 2 is an elevation of the spiral tube of the same, and its sub-base by which it is mounted.

Figure 3 is an elevation of the opposite face of the same; and

Figure 4 is a sectional elevation of the sub-base with the section taken approximately along the line 4—4 of Figure 3.

In the illustrated embodiment of the invention, the particular instrument selected by way of example is of the indicating type, and may include a suitable casing 10 having a transparent window 11 in its front face, through which a dial 12 may be viewed without opening the case. The dial 12 may be mounted within the casing in any suitable manner and is spaced somewhat from the transparent window 11, to provide a space for the indicator which moves across the dial in a manner to be explained shortly.

A plate 14 of sheet metal is provided with a tongue 15 extending in its plane from one edge thereof, and may also be provided with struck out feet 16, which feet are struck outwardly and rearwardly and then at their free ends bent parallel to the plane of the plate, all of the outer ends of the feet 16 lying in the same plane, so as to fit against the rear wall of the casing 10 to which they are secured in any suitable manner, such as by screws 17 which pass through the casing and are threaded into the ends of the feet 16.

A bearing pin 18 is provided adjacent one end with an enlargement 19, with the extreme tip end portion 20 thereof of somewhat smaller cross sectional dimensions.

The tip end portion 20 passes through an aperture 21 in the plate 14 until the enlargement 19 abuts against the front face of the plate 14. The pin 18 extends from the plate 14 in the opposite direction from the feet 16. The end 20 of the pin which extends through the plate is secured therein in any suitable manner such as by upsetting its end into a slight countersink in the face of the plate, or by peening over its projecting end.

A spirally coiled Bourdon tube 22 is disposed about the bearing pin 18. The outer end of the spiral is connected to one or more capillary tubes 23, in any suitable manner such as by inserting the tubes in the open end of the tube and soldering or otherwise securing them therein, and re-inforcing the end by a clip 24 that is provided with an ear or angular extension 25. This extension or ear abuts against the front face of the tongue 15 of the plate 14. The angular extension or ear 25 and the tongue 15 of the plate 14 are coupled together for relative movement approximately in a direction toward and from the bearing pin 18. For example, the tongue 15 may be provided with a slot 26 which extends approximately radially of the bearing pin for a limited extent, and a shoulder screw 27 may pass through the slot and be threaded into the angular extension or ear 25, so as to slidingly confine the extension 25 to the tongue 15. With such an arrangement it will be obvious that the outward end of the coil tube or spring may move toward and from the bearing pin 18 as the spiral tube expands and contracts, and at the same time the tube will be held by the screw 27 against rotation or angular movement about the bearing pin.

A bearing sleeve 28 is rotatably mounted upon the bearing pin 18, and a bimetallic strip 29 is spirally coiled upon itself about the sleeve 28, connected at one end to the sleeve, and at its other end connected to the inner end of the tube 22. The inner end of the tube 22 is closed and the spiraling of the strip 29 is opposite in direction to that of the tube, for a purpose which will appear presently. A suitable driven element 30 (see Figure 1) is secured to the sleeve 28 so as to be operated therefrom. Such a driven element may be an indicating pointer cooperating with a suitable dial, or a recording arm co-operating with a suitable revolving dial, or it may be a member utilized to perform some suitable controlling or regulating function.

In order to prevent undue expansion and excess distortion of the Bourdon tube when it is subjected to unduly high pressures or unusual increases in volume of the actuating fluids, I preferably connect together two convolutions of the tube adjacent its outer end, which forms a limiting ring from a portion of the tube itself. For example, the clip 24 which is secured to the outer end of the tube may be connected to the next adjacent convolution or turn of the tube, by a small deposit of solder 31 (see Figure 2), which I have found is a very simple and effective manner of connecting the convolutions in order to form the limiting ring. This ring therefore limits the expansion of the tube when subjected to pressures beyond the range for which it is designed.

The capillary tube 23 may encircle the Bourdon tube and then extend out of the casing through a suitable split clamping bushing 32, and be protected, if desired, by a suitable sleeve 33. The outer end of this capillary tube may be connected to a source of pressure to which the instrument is to be responsive, such as to a bulb 34, which is disposed in a locality usually remote from the casing 10 where the temperature or pressure variations are to be indicated and may be partially filled with an expansive or volatile liquid. This liquid should preferably also fill the capillary 23 and Bourdon tube 22, the filling being made through the short tube 23 before its end is closed. The fluid in the bulb 34 will expand or contract under varying temperatures or pressures, and the resulting variations in pressure of the fluid will be transmitted through the capillary tube to the interior of the Bourdon tube. The latter will expand or contract in accordance with such pressure variations, and as it expands or contracts its inner end will turn the sleeve 28, and through it operate the driven member or indicator arm 30 through a proportionate extent across the dial 12. If the pressure in the bulb becomes unduly high, the expansion of the tube will be limited by the closed ring formed by securing the outer end of the tube to an adjacent convolution of the tube, and therefore the tube cannot expand to such an extent that it will become permanently distorted or set, such as would permanently change the accuracy of its reading.

It will be obvious that if the casing 10 is also subjected to different temperatures having no relation to the temperatures to which the bulb 34 is subjected, the tube, by reason of its contained fluid and its own construction, will expand or contract to some extent and therefore cause a movement of the driven member or indicating arm 30. Such movement of the arm 30 indicates a change in temperature or pressure having no relation to the bulb 34 and, therefore, causes a false and misleading indication.

The bimetallic strip 29, because it is coiled in an opposite direction from the tube 22, will expand in the opposite direction from the tube 22 and tend to cause a reverse movement of the sleeve 28 by an amount which will compensate for the changes in tube 22 due to the local temperature variations to which it is subject. By using the bimetallic strip instead of an ordinary strip it is possible to utilize a much shorter strip 29 for effecting the compensation. Thus the expansion of the tube 22 due to local temperature variations will be compensated for by bimetallic strip 29, and therefore the driven member or indicator arm 30 will respond only to temperature or pressure changes to which the bulb 34 is subjected.

During the expansion or contraction of tube 22, the outer end may move toward or from the bearing pin 18 to some extent, by reason of the pin and slot connection between it and the sub-base or plate 14 to which it is connected and by which it is held against rotation. This gives freedom for the expansion and contraction of the tube without the restriction heretofore existing therein by the permanent anchoring of the tube end, and therefore, the expansion and contraction of the tube will be more sensitive to its internal pressure and less modified by its own structural oppositions to such expansion and contraction. The loop in the tube 23 before it leaves the casing permits of a comparatively free and unrestricted movement of the Bourdon tube.

The pin and slot anchorage of the outer end of the tube relieves the tube of many of the stresses and strains which are induced therein by its irregular expansion, and gives the tube a freedom of action which is equivalent to the use of a self-lining or self-centering pivot. The sub-base or plate 14 may be readily formed by stamping and drawing it from sheet metal, and provides a simple, practical and convenient mounting for the tube.

It will be obvious that various changes in the details, which have been herein described and illustrated in order to explain the nature of the invention, may be made by those skilled in the art within the principle and scope of the invention as expressed in the appended claims.

I claim as my invention:

1. In apparatus of the character described, the combination with a tube of the Bourdon type, a driven element and means whereby said element is connected to one end of the tube for actuation thereby, of means supporting the other end of the tube, including means defining a slide way and a member movable in said slide way, the said member being connected to the tube.

2. In apparatus of the character described, the combination with a tube of the Bourdon type, a driven element and means whereby said element is connected to the inner end of the tube for actuation thereby, of means supporting the outer end of the tube, including means defining a slide way and a member movable in said slide way, the said member being connected to the tube.

3. In measuring, indicating and controlling instruments and the like, a coiled Bourdon tube, a support, a driven element, means whereby said element is connected to one end of the tube for actuation thereby and mounted upon said support for movement in a definite path, the other end portion of the tube and support having a sliding interconnection in a direction approximately radially of the coil, whereby the outer end portion of the coil may move radially with freedom.

4. In measuring, indicating and controlling instruments and the like, a coiled Bourdon tube, a support, a driven element, means whereby said element is connected to one end of the tube for actuation thereby and mounted upon said support for movement in a definite path, the other end portion of the tube being connected to an adjacent convolution of the coil to prevent excess distortion of the coil when subjected to unduly high pressures while permitting full movement of the coil, the said other end portion of the coil and the support having a sliding interconnection with one another permitting free radial movement of the said end portion.

5. In measuring, indicating and controlling instruments and the like, a Bourdon tube, a sub-base having a bearing pintle and a slot extending in a direction radially therefrom, a driven element rotatably mounted upon said pintle and means whereby said element is connected to one end of the tube, and a confining member connected to the other end of the tube and slidingly confined to said slot.

6. In measuring, indicating and controlling instruments and the like, a support of stamped sheet metal having integral tongues extending therefrom and serving as supporting feet, a bearing pintle carried by said support, a driven element rotatably carried by said pintle, a Bourdon tube, and means whereby said tube is connected at one end to said driven element and at its other end having an interconnection with said support permitting radial movement of that end of the tube generally toward and from the pintle as the tube expands and contracts.

7. In measuring, indicating or controlling instruments and the like, a spiral Bourdon tube having a plurality of convolutions, a driven element, means whereby said element is connected to the inner end of the tube, for operation therefrom and a connection between the outer end of the tube and the adjacent convolution to form a confining ring limiting the expansive movement of the convolutions within the ring.

8. In measuring, indicating and controlling instruments and the like, a spiral Bourdon tube, a driven element, means whereby said element is connected to the inner end of the tube, for operation therefrom and means for interconnecting the outer end of the tube with the adjacent convolution to form a confining ring limiting the expansive movement of the convolutions within the ring and means permitting the outer end of the tube to freely move in a prescribed path.

9. In apparatus of the character described, the combination with a tube of the Bourdon type, a driven element and means whereby said element is connected to the inner end of the tube for actuation thereby, of means supporting the outer end of the tube for movement in a radial path and means for connecting the outer end of the tube to the adjacent convolution to form a confining ring limiting the expansive movement of the convolutions within the ring.

10. In a measuring, indicating or controlling instrument and the like, a spiral Bourdon tube having a plurality of convolutions, a driven element, means whereby said element is connected to the inner end of the tube, for operation therefrom and a rigid connection between the outer end of the tube and the adjacent convolution to form a confining ring limiting the expansive movement of the convolutions within the ring.

CHARLES A. WITHERS.